United States Patent [19]
Iizuka et al.

[11] Patent Number: 5,429,213
[45] Date of Patent: Jul. 4, 1995

[54] DRUM BRAKE CLEARANCE ADJUSTMENT STAYING DEVICE

[75] Inventors: Yukio Iizuka; Toshiki Minai, both of Nagoya; Ryosuke Matsunaga; Shinsuke Akimoto, both of Aichi, all of Japan

[73] Assignee: Nisshinbo Industries, Inc., Tokyo, Japan

[21] Appl. No.: 167,345

[22] Filed: Dec. 16, 1993

[30] Foreign Application Priority Data

Dec. 21, 1992 [JP] Japan .................. 4-355379

[51] Int. Cl.⁶ .......................................... F16D 51/24
[52] U.S. Cl. .......................................... 188/79.52
[58] Field of Search .......... 188/79.51, 79.52, 196 R, 188/79.59, 79.63, 198

[56] References Cited

U.S. PATENT DOCUMENTS

| | | | |
|---|---|---|---|
| 2,570,398 | 10/1951 | Smith | 188/79.52 |
| 3,983,970 | 10/1976 | Courbot | 188/79.52 |
| 5,246,090 | 9/1993 | Quere et al. | 188/79.52 |

FOREIGN PATENT DOCUMENTS

| | | | |
|---|---|---|---|
| 3139173 | 4/1983 | Germany. | |
| 0292934 | 12/1987 | Japan | 188/79.52 |
| 2132291 | 7/1984 | United Kingdom. | |

*Primary Examiner*—Robert J. Oberleitner
*Assistant Examiner*—Peter M. Poon
*Attorney, Agent, or Firm*—Nikaido Marmelstein Murray & Oram

[57] ABSTRACT

Matching mounting holes 25 and 85 are bored into the shoe web 22 of one brake shoe 20 and the base end 81 of the temperature sensor 80 respectively, and a clip is inserted through both holes, thereby biasing the temperature sensor in the direction towards the surface of the shoe web and into the detector hole 24, and elastically affixing the temperature sensor to the shoe web. This enables simple insertion and removal of the temperature sensor and regulates the blind movement of the temperature sensor in an automatic shoe clearance adjustment device.

12 Claims, 9 Drawing Sheets

DRUM BRAKE CLEARANCE ADJUSTMENT STAYING DEVICE

BACKGROUND OF THE INVENTION

This invention relates to a drum brake equipped with a device that automatically adjusts the shoe clearances, and more specifically relates to a drum brake clearance adjustment staying device that halts this clearance adjustment when the brake temperature rises.

This type of device has been disclosed in the publication of Examined Japanese Patent Application Number 2(1990)-11768. A drum brake is generally fitted with an automatic shoe clearance adjustment device. This is a device in which a protrusion at one end of a bell crank lever, mounted to pivot on a strut, interlocks in a hole provided in one shoe web, with a certain amount of slack in the direction of movement of the brake shoe. When wear of the brake shoe lining would cause the amount of expansion of the brake shoes to exceed the slack, the bell crank lever pivots to expand the diameter between the two brake shoes, thereby automatically reducing the excess clearance.

The brake clearance adjustment device functions in the same manner should the brake drum thermally expand with friction. Hence, when the brake drum cools and contracts, the clearance between it and the brake shoe becomes much too narrow. A brake clearance adjustment staying device was developed to resolve this problem, and comprises a flat temperature sensor, which starts to deform at a specified temperature, with its base end riveted to the shoe web and a detector component, bent and molded at the free end of the temperature sensor, interlocking in the hole in which the protrusion of the bell crank lever is inserted. If the brake temperature starts to rise, the detector component of the temperature sensor slips out of the hole in the shoe web and starts to deform in the direction to actually increase the above mentioned slack.

Conventional clearance adjustment staying devices with such a temperature sensor are subject to certain difficulties.

The temperature sensor must be pre-mounted to a segment of the brake shoe with rivets. Accordingly, handling and stacking during shipping of a brake shoe with a mounted temperature sensor could deform the component. If the brake shoe has to be replaced because of lining wear, the entire unit including the temperature sensor has to be replaced. The temperature sensor is affixed to the shoe web by rivets inserted into round holes bored through both materials, after which the rivets are caulked; however, caulking of the rivets is tedious, requiring special caulking equipment. Since the shoe web and the temperature sensor are fitted together with rivets inserted in round holes, the temperature sensor can rotate freely relative to the shoe web, whereby the detector component of the temperature sensor can slip out of the hole in the web, and even become stranded on top of the web, where it will lose its basic function.

SUMMARY OF THE INVENTION

The object of this invention is to provide a drum brake clearance adjustment staying device in which the temperature sensor can easily slip in and out of the shoe web, and wherein the blind movement of the temperature sensor can be regulated.

This invention is a novel drum brake clearance adjustment staying device comprising an automatic clearance adjuster configured from a strut positioned between two facing brake shoes with a bell crank lever mounted to pivot at one end of the strut. The bell crank lever has a protrusion at one end that interlocks with a specified slack into a detector hole bored into one shoe web. When the amount of expansion of the brake shoes exceeds this specified slack, the bell crank lever pivots to automatically adjust the clearance between the brake shoes and the drum. A flat temperature sensor is configured with its base end mounted to the shoe web, and an edge of the opposite free end bent at right angles to form a detector that interlocks into a detector hole bored into the shoe web. As the brake temperature rises, the detector of the temperature sensor slips out of the shoe web to enable the temperature sensor to deform in the direction to substantially increase the above-described slack. The base end of the temperature sensor is biased in the direction towards the surface of the shoe web and into the detector hole, thereby elastically affixing the temperature sensor to the shoe web.

With the present invention, certain benefits are obtained. The detector component of the temperature sensor which slips out of the detector hole in the shoe web will always return into the hole even if there is a slight looseness between the clip, the mounting hole of the temperature sensor, and the mounting hole in the shoe web. This ensures that the shoe clearance adjustment function is not lost, thus improving the reliability of operation. The base end of the temperature sensor contacts the shoe web by a clip inserted from the reverse side of the back plate; thus the temperature sensor can be mounted after the brake assembly is assembled. This will prevent deformation of the temperature sensor through handling and stacking during transport. The temperature sensor is not permanently attached to the shoe web and can be removed and re-used after replacement of the brake shoe. The temperature sensor contacts the shoe web by means of a clip; thus mounting is simple without the need for special equipment. The shoe web and the base end of the temperature sensor are elastically fitted together by the clip, thus the temperature sensor can rotate along the surface of the shoe web and the free end can be prevented from being displaced from the detector hole to remain stranded on top of the shoe web when the brake temperature rises. An elastic interlocking wedge can be integrally formed on the base end of the temperature sensor to reduce the number of parts.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENTS

This invention is explained by the following examples with reference to the attached diagrams.

Figure 1:
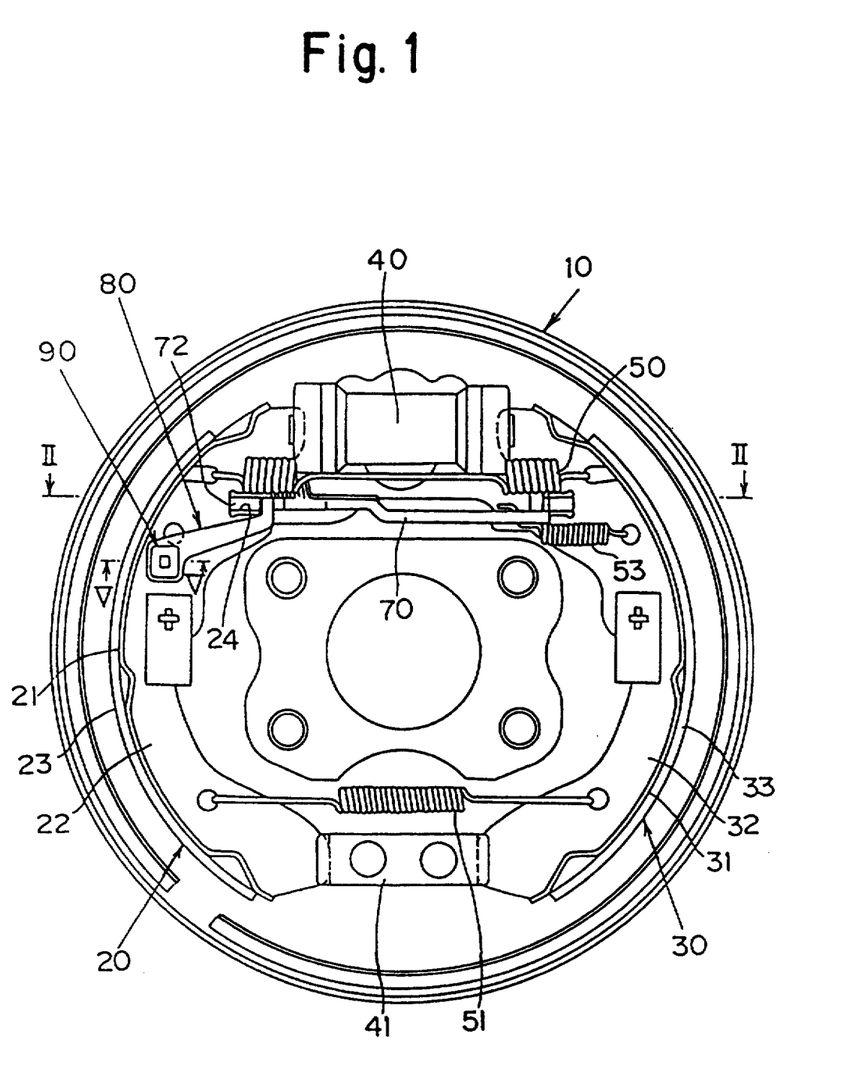
FIG. 1 is a plan view of a drum brake which includes the present invention.
Figure 2:
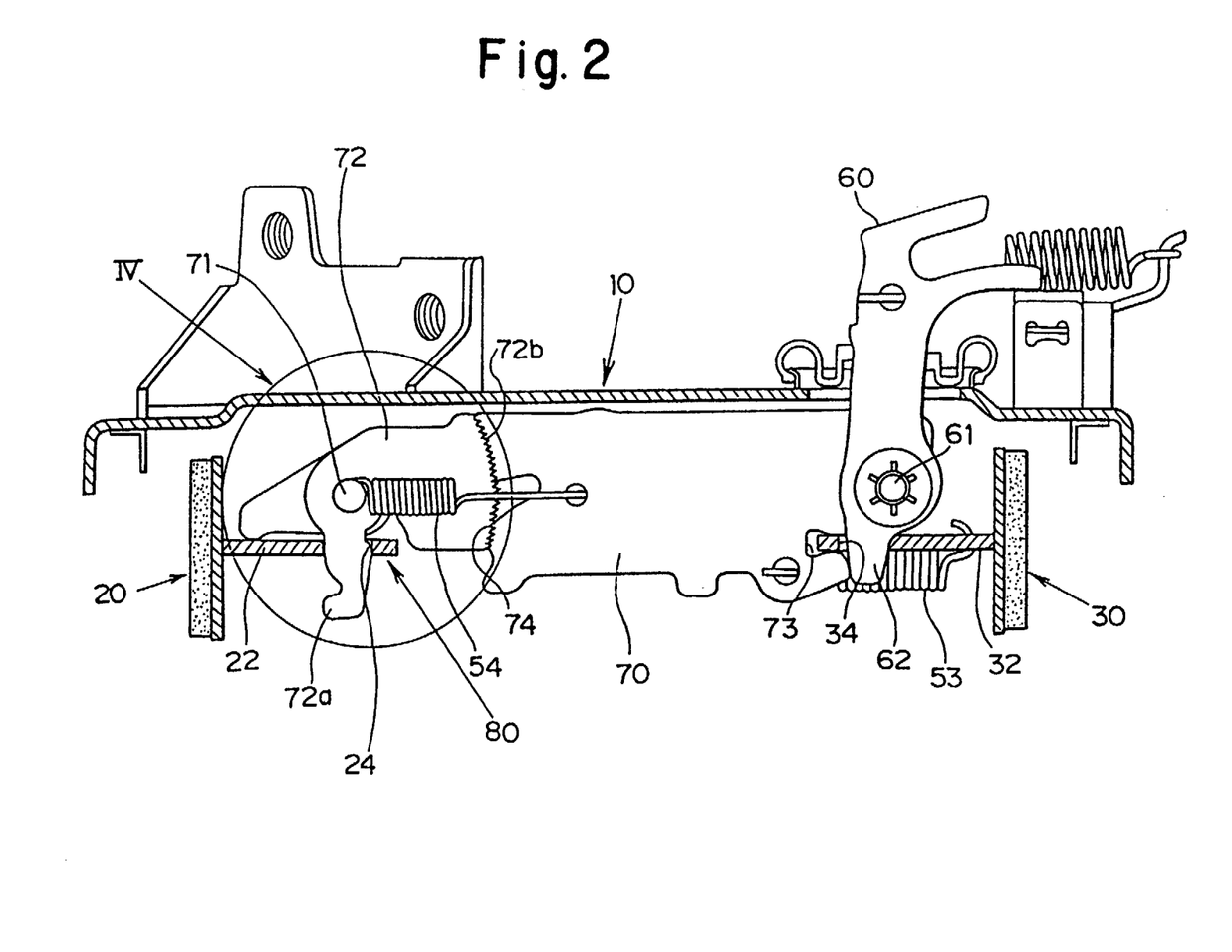
FIG. 2 is a cross section view of FIG. 1, taken along lines II—II.

FIG. 1 and FIG. 2 illustrate an example of a drum brake fitted with an automatic shoe clearance adjustment device and a clearance adjustment staying device. The back plate is affixed to the vehicle body. A pair of left and right brake shoes 20, 30 are set inside the back plate such that they can open and expand. The brake shoes 20, 30 are formed from shoe webs 22, 32 bonded on the inner circumference of arc-shaped rims 21, 31, and friction liners 23, 33 affixed on the external circumferences thereof.

The wheel cylinder 40, that expands the brakes shoes 20, 30, and the anchor 41 that becomes the fulcrum for the brake shoes 20, 30 to expand and contract, are positioned on the upper and lower end respectively inside the back plate 10. The upper return spring 50 and lower return spring 51, each constantly biassing in the direction of contraction, are tensioned between the brake shoes 20, 30.

A brake lever 60 penetrates through the back plate 10, wherein one end of the brake lever pivots at the right end of the strut 70 by means of pin 61. The locking arm 62 of the brake lever 60 interlocks in the hollow hole 34 bored in the shoe web 32 of the brake shoe 30 on the right side of the diagram; the other end of the brake lever 60 being connected to a tension cable not shown in the diagram.

The automatic shoe clearance adjustment device includes a bell crank lever 72 which pivots by means of pin 71 at the left end of the flat strut 70. The protrusion 72a at one end of the bell crank lever 72 interlocks in the detector hole 24 bored into the brake shoe 20 on the left side of the diagram. The shoe web 32 of the other brake shoe fits into the groove 73 on the right end of the strut 70. A spring 53 tensioned between the strut 70 and the shoe web 32 constrains any rattling between the two components. The toothed edge 72b of the other arm of the bell crank lever 72 curved radially around the pin 71 meshes with the toothed mating edge 74 on the left side (of diagram) of the strut 70. A spring 54, biassing in the direction to mesh the toothed edge 72b with the toothed mating edge 74, is tensioned between the pin 71 and the strut 70.

Except for the clearance adjustment staying device to be described below, the configuration of the brake assembly and the action and other features of the automatic shoe clearance adjustment device explained above are similar to conventional devices.

Figure 3:
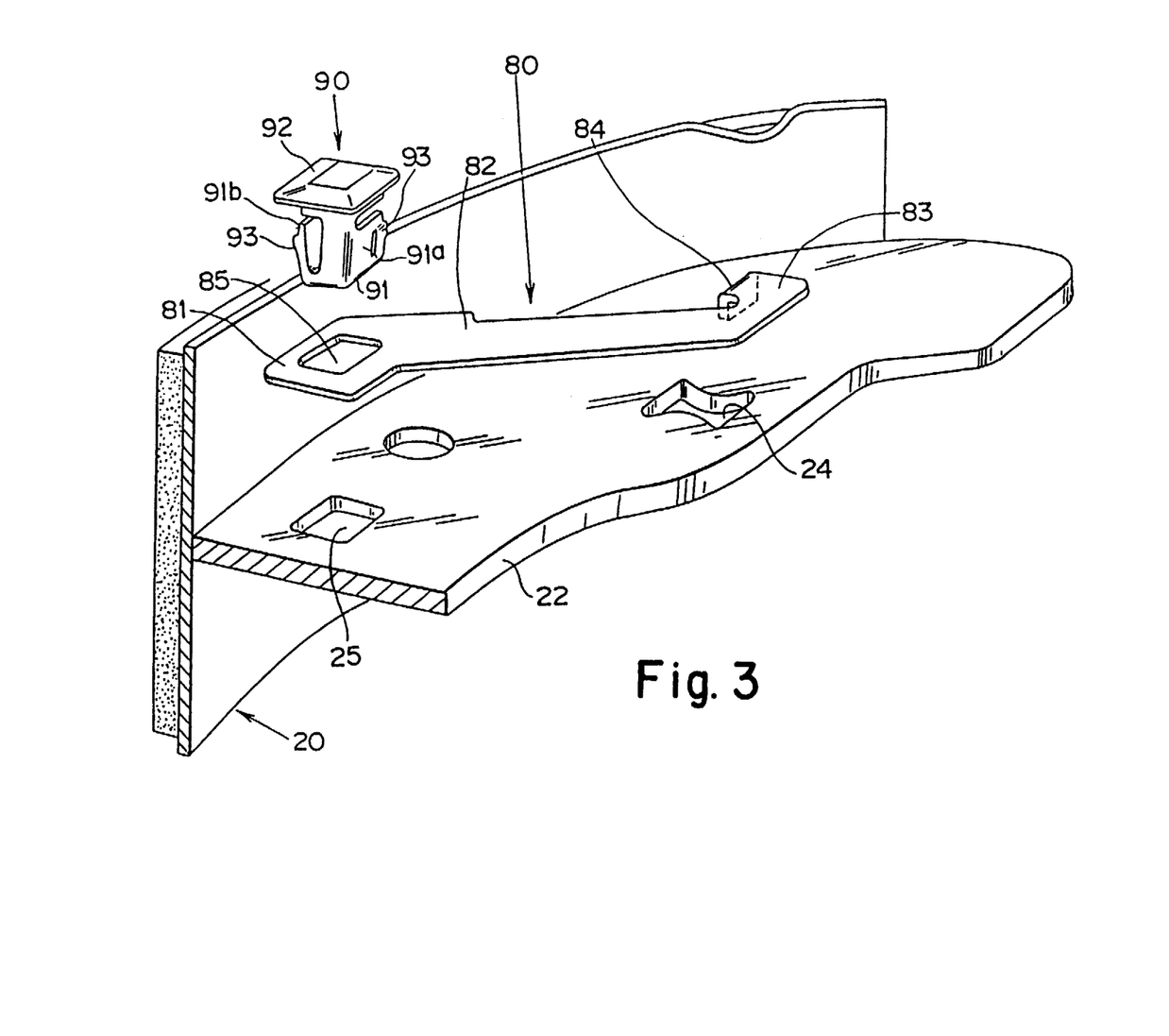
FIG. 3 is an assembly diagram of the temperature sensor.

FIG. 3 illustrates the components of the clearance adjustment staying device before assembly into the automatic shoe clearance adjustment device.

Figure 4:
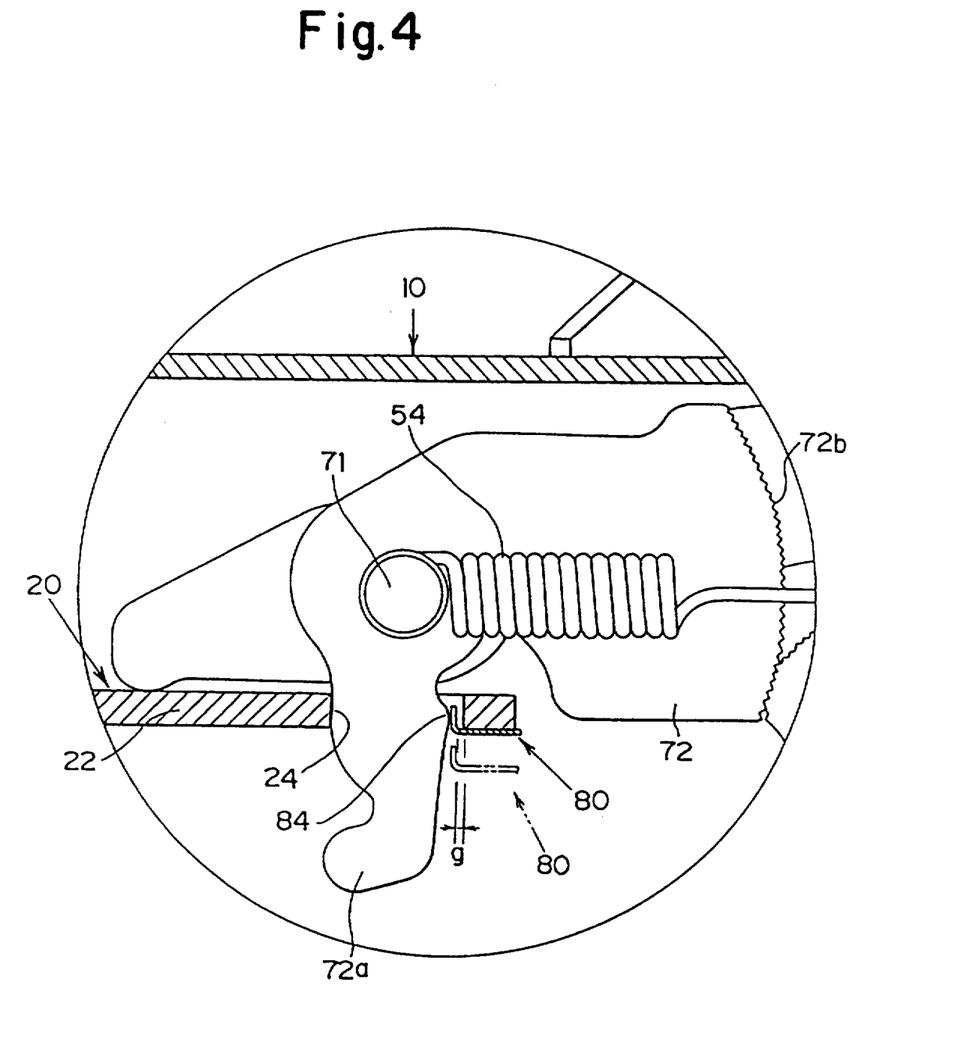
FIG. 4 is an enlarged diagram of the area within the circle indicated by IV, in FIG. 2.
Figure 5:
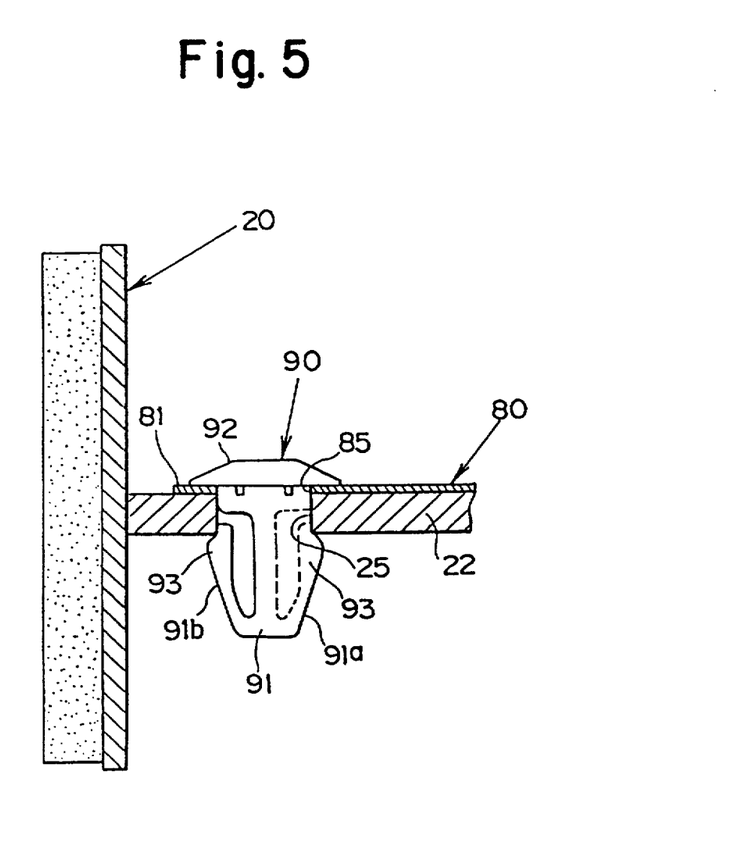
FIG. 5 is a cross sectional view of FIG. 1 taken along lines V—V.

FIG. 4 illustrates after assembly. As shown in FIG. 3, the temperature sensitive component or sensor 80 which detects a temperature rise in the brakes and deforms accordingly, is molded from a flat strip of bimetallic or shape-memory alloy or similar metal. The temperature sensor 80 comprises a base end 81 held on to the shoe web 22 of one brake shoe 20, a free end 82 extending from the base end 81 in the same plane, a hook 83 extending from and in the same plane as the free end 82, and a detector 84 bent at right angles to the flat surface of the hook 83.

The assembly configuration of the temperature sensor 80 of this invention is as follows.

A mounting hole 85 of the same shape (such as oval, triangular, or polygonal) as the mounting hole 25 bored in the shoe web 22, is bored into the base end 81 of the temperature sensor 80. The temperature sensor 80 is elastically attached to the brake shoe 20 by a clip 90, shown in the diagram, that fits through both mounting holes 25, 85. Both mounting holes 85 and 25 should be of the same shape which preferably is not circular.

As shown in FIG. 4, the detector 84 of the temperature sensor 80 is inserted into the detector hole 24 in the shoe web 22 so as to abut the side face of protrusion 72a of the bell crank lever 72, such that a specified slack g is secured at normal temperatures between the detector 84 and the detector hole 24.

Figure 6:
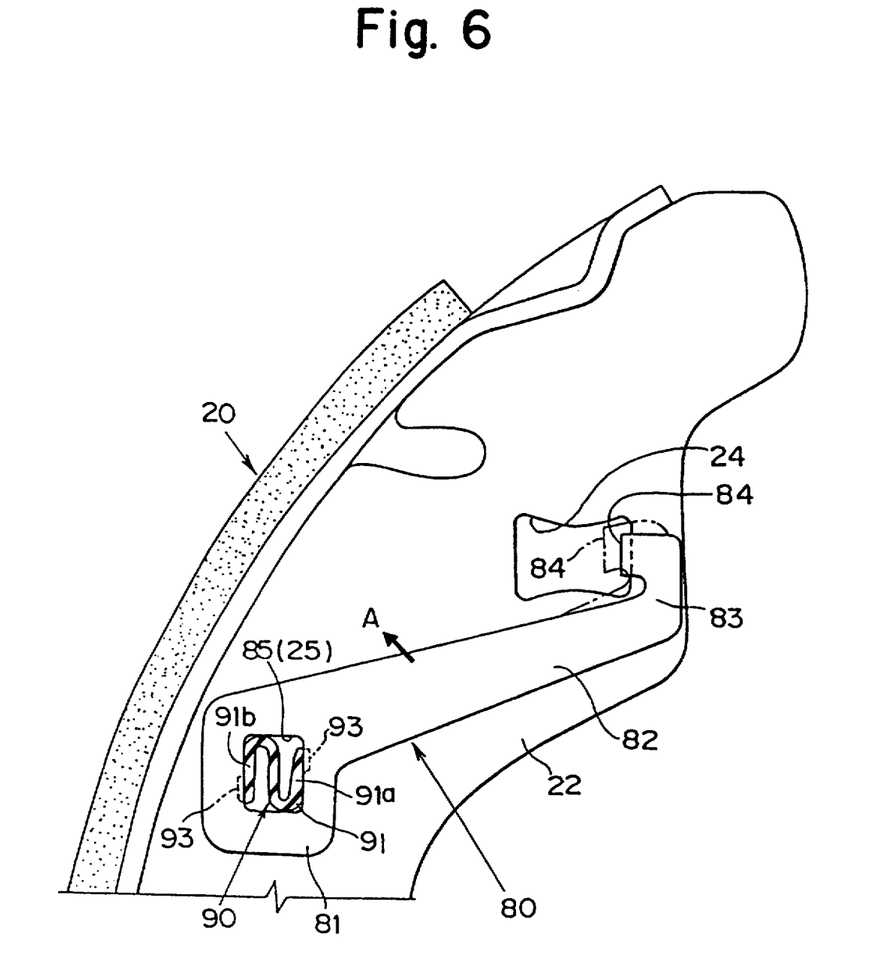
FIG. 6 is a partial plan view to explain the operation of the temperature sensor.
Figure 7:
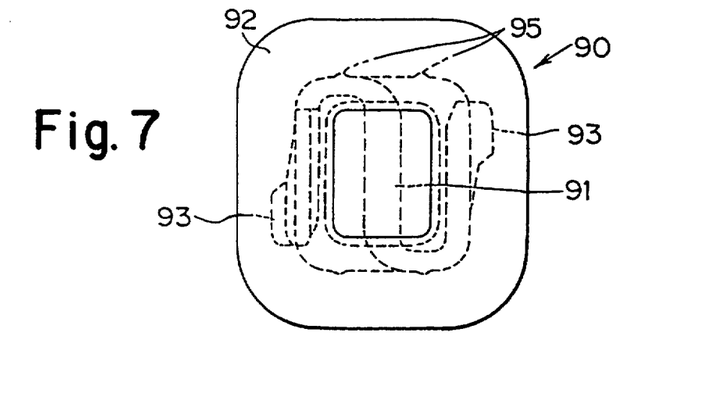
FIG. 7 is a top plan view of the temperature sensor.
Figure 8:
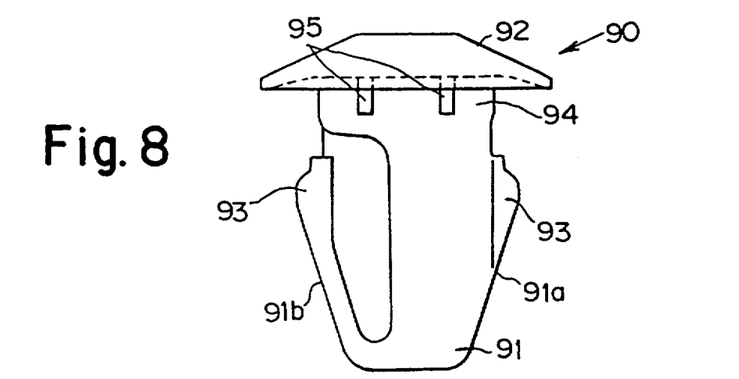
FIG. 8 is a front view of the temperature sensor.
Figure 9:
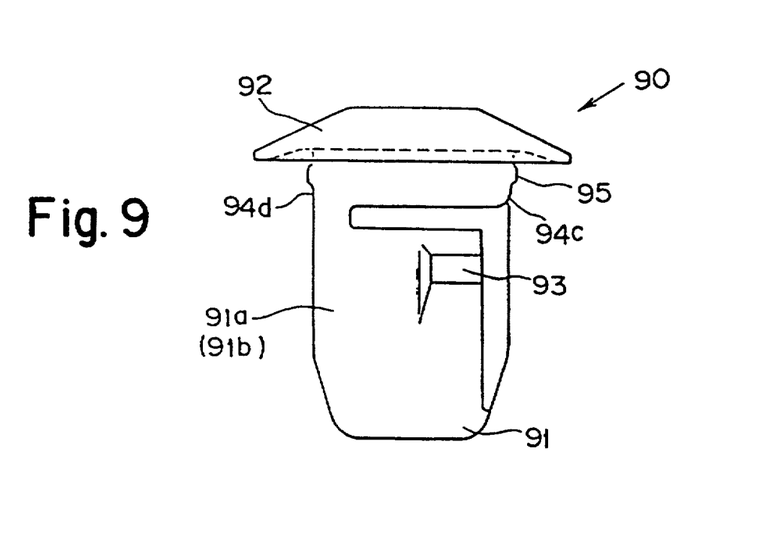
FIG. 9 is a side view of the temperature sensor.

The clip 90 has another function in addition to elastically affixing the base end 81 of the temperature sensor 80 to the shoe web 22. As shown in FIG. 6, the temperature sensor 80 is biased with a rotational force to pivot with the clip 90 around a center axis of the clip in a counterclockwise direction A (the direction outward from the center of an imaginary circle formed by a pair of brake shoes 20, 30).

The clip 90 is provided with this function for the following reason. Without this function, the fitting of the clip 90 in the mounting hole 85 of the temperature sensor 80 and the mounting hole 25 of the shoe web 22 could be such as to cause rattling of the three components. In such a case, when the temperature falls, the detector 84 of the temperature sensor 80 could get snagged and remain outside of the detector hole 24. This would create an excessive slack of the protrusion 72a of the bell crank lever 72 inside the detector hole 24, and the normal automatic shoe clearance adjustment function will be lost. Thus, to prevent this type of dangerous situation, the clip 90 constantly urges the detector 84 in the direction to be housed securely within the detector hole 24.

FIGS. 5–9 illustrate the clip 90. The clip 90 comprises an insertable stem 91 of a cross section shape corresponding to and insertable through the mounting hole 85 in the base end of the temperature sensor 80 and the mounting hole 25 in the shoe web 22, and a head 92 molded of a diameter greater than and adhered with resin or other substance on top of the insertable body 91 to form an integrated unit.

The insertable stem 91 forms a reverse-S in the cross section, and at minimum, the two side faces 91a and 91b facing each other are elastic. These faces must be elastic so that when squeezed for insertion into the mounting holes 85 and 25, an elastic force (rotational force) will be generated in clip 90. To provide this elastic force, the clip 90 should be molded of a dimension such that in its free state, it will be bigger than the mounting holes 85, 25.

On the exterior surface of these side faces 91a and 91b, at least one interlocking wedge 93 is molded in the shape of a wedge around the point of symmetry, increasing in thickness in the direction from the bottom towards the head 92. This interlocking wedge 93 abuts against the bottom face of the shoe web 22, and functions together with the head 92 to keep the base end 81 of the temperature sensor 80 and the shoe web 22 fitted together. Hence, the interlocking wedge 93 is not restricted to a two-piece unit as shown in the figure, but can be a 4-piece, or even a 3-piece-or 5-piece unit corresponding to the shape of the mounting holes 25, 85.

Several strips 95 project vertically down from around the circumference of the neck 94 at the top of the insertable stem 91. These strips 95 reduce the contact resistance between the mounting holes 85 and 25 of the temperature sensor 8 and the shoe web 22 respectively, and facilitate the insertion or removal of the clip 90, and can be omitted.

The operation of the clearance adjustment staying device will be explained next.

Prior to the present invention, the temperature sensor 80 had to be mounted by rivets or other means onto a specific brake shoe before assembling the brake shoes 20, 30 into the brake assembly. In this invention, the temperature sensor 80 need not be pre-installed onto the brake shoe 20, but can be installed as follows after the brake shoes 20, 30 are assembled inside the brake assembly.

As shown in FIG. 3, the temperature sensor is mounted on the upper face of the brake shoe 20 on the reverse side of the back plate 10. To mount the sensor, the detector 84 is inserted into the detector hole 24 of the brake shoe web 22. The mounting hole 85 of the temperature sensor 80 and the mounting hole 25 of the brake shoe web 22 are aligned, and the insertable stem 91 of the clip 90 is inserted until the head 92 presses against the temperature sensor 80, and the at least one interlocking wedge 93 locks onto the lower face of the shoe web 22. The base of the temperature sensor will thus be elastically affixed to the shoe web 22.

Then as shown in FIG. 6, the temperature sensor 80 receives the rotational force of the clip 90, the detector 84 at the tip of the temperature sensor 80 abuts the bell crank lever 72 as shown in FIG. 4, and a specified slack g (FIG. 4) will be secured between the detector 84 and the detector hole 24.

Should the temperature inside the drum brake reach the set temperature, the temperature sensor 80 with its base end 81 as the pivot point as shown in FIG. 4, actively moves in the direction to separate from the shoe web 22 of the brake shoe 20. As shown by the broken line in FIG. 4, the detector 84 slips out of the detector hole 24 of the shoe web 22, whereby the amount of slack of the protrusion 72a of the bell crank lever 72 inside the detector hole increases. As a result, should the brake drum thermally expand causing the clearance between the brake shoes 20, 30 and the brake drum to increase, the automatic shoe clearance adjustment becomes suspended even if the brake shoes 20, 30 move beyond what is required. Also, as shown in FIG. 6, the temperature sensor expelled from the detector hole 24 receives the rotational force of the clip 90 and rotates only very slightly around the clip. The state of the detector 84 of the temperature sensor 80 after rotation is shown by the chain line.

As the temperature inside of the drum brake starts to fall, the temperature sensor 80 deforms in the direction to abut the shoe web 22 of the brake shoe. Since, as shown in FIG. 6, the temperature sensor 80 is changing position with receipt of the rotational force of the clip 90, then the detector 84 returns securely into the detector hole 24 despite any slight looseness between the clip 90, the mounting hole 85 of the temperature sensor 80, and the mounting hole 25 of the shoe web 22.

In replacing the brake shoes 20, 30, a proper tool can be used to pinch the at least one interlocking wedge 93 of the clip 90, and remove the clip 90 in the direction of the head 92. The temperature sensor 80 is then dismounted from the brake shoe 20 and can be reused.

The clip 90 need not be adhered together with resin as describe above, but can for example be of a flat spring or wire spring construction.

Figure 10:
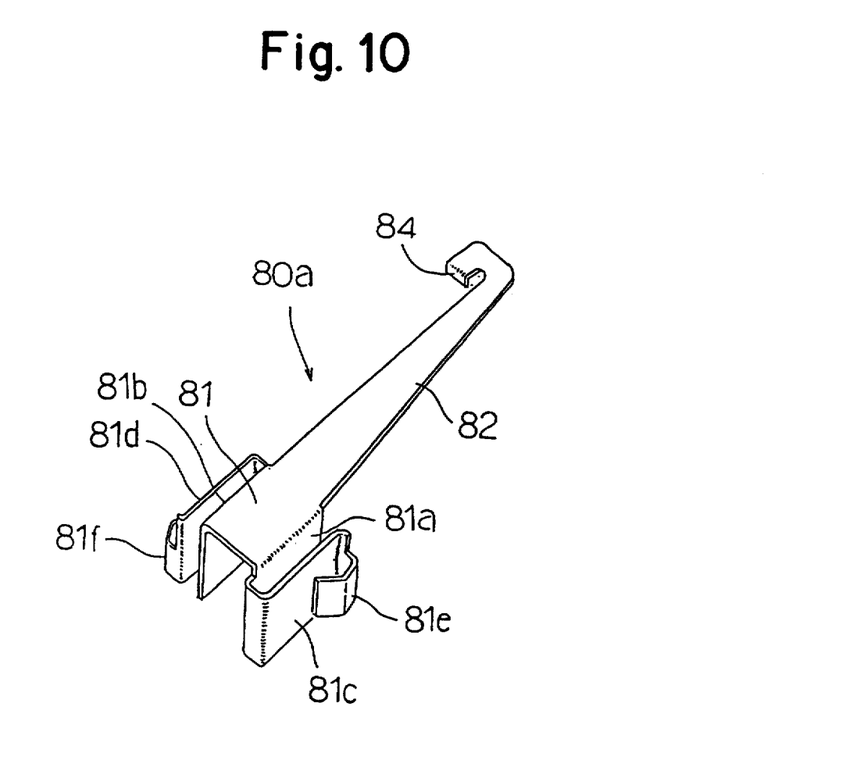
FIG. 10 is an explanatory diagram of another type of temperature sensor as embodied in Example 3.

FIG. 10 illustrates another embodiment of this invention wherein the clip is molded to the temperature sensor 80a as one integral unit. In explaining this example, those components in position identical with previous examples have the same identification symbols, and an explanation is omitted.

The base end 81 of the temperature sensor 80 is molded like a box, but with the two facing sides 81a and 81b extended to form segments 81c and 81d respectively, which are bent backwards to form elastic interlocking components 81e and 81f respectively. The upper portion of each interlocking component 81e and 81f is cut away to a specified width in order to abut the underside of the shoe web (not shown in diagram).

The design of this invention as embodied in this example eliminates the need for an independent clip 90 as used as in the previous examples, thus reducing the number of parts and facilitating assembly.

Figure 11:
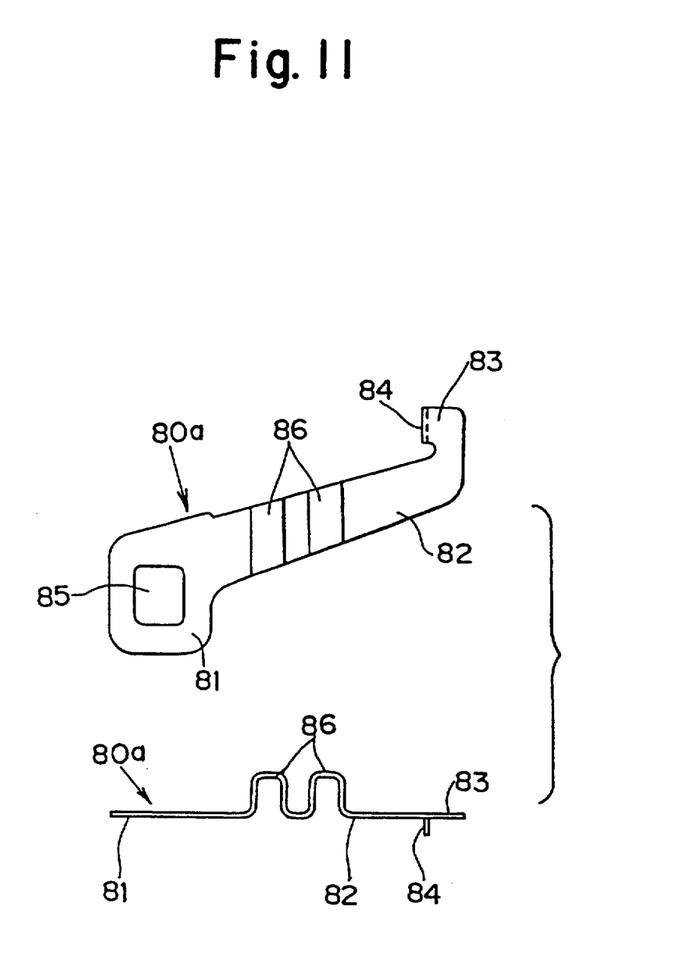
FIG. 11 is an explanatory diagram of another type of temperature sensor as embodied in Example 4.

FIG. 11 illustrates another temperature sensor in which curves 86 are molded in the body and the free end 82 is bent. The inclusion of these curves 86 lengthens the free end 82 to improve temperature sensitivity.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A drum brake clearance adjustment mechanism including a clearance adjustment staying device and a clearance adjuster, said clearance adjuster comprising a strut positioned between two facing brake shoes and a bell crank lever mounted to pivot at one end of the strut, said bell crank lever having a protrusion at one end interlocking with a specified slack into a detector hole bored into a web of one of the two shoes, wherein should the amount of expansion of the brake shoes exceed said specified slack, said bell crank lever pivots to automatically adjust a clearance between the brake shoes and a brake drum; and said clearance adjustment staying device comprising a flat temperature sensor having a base end non-pivotally mounted to the shoe web and a detector formed from an edge of an opposite free end bent at right angles, said detector interlocking into said detector hole bored into the shoe web, and a clip elastically affixing the temperature sensor to the shoe web at the base end, the temperature sensor being biased in the direction towards one surface of the shoe web and into the detector hole, wherein as the brake temperature rises, the temperature sensor deforms in a direction such that the detector slips out of the detector hole in the shoe web to substantially increase the slack.

2. A mechanism as claimed in claim 1, wherein said clip additionally biases said temperature sensor with a rotational force in a plane parallel to the shoe web in a direction to ensure said detector returning to said detector hole upon a decrease in brake temperature.

3. A mechanism as claimed in claim 1, wherein the web has a mounting hole for said clip and said base end of said temperature sensor has a mounting hole having a shape which matches the shape of said mounting hole in the shoe web.

4. A mechanism as claimed in claim 3, wherein said mounting hole in said shoe web and said mounting hole in said base end are non-circular.

5. A mechanism as claimed in claim 3, wherein said clip comprises a stem insertable into said mounting hole in said base end and said mounting hole in the shoe web and a head of a diameter greater than said stem.

6. A mechanism as claimed in claim 5 wherein said stem has at least two side faces which are elastic and press against said mounting hole in the shoe web when inserted therein.

7. A mechanism as claimed in claim 6, wherein said stem is formed as a reverse-S in cross-section.

8. A mechanism as claimed in claim 6, wherein at least one interlocking means is provided on an exterior face of said side faces for engagement with a surface of the shoe web opposite to said one surface of the shoe web.

9. A mechanism as claimed in claim 8, wherein said at least one interlocking means is wedge formed on said exterior face of said side face increasing in thickness from one end of said stem towards said head.

10. A mechanism as claimed in claim 3, wherein said clip is made integrally with said base end of the temperature sensor and comprises two facing sides extended to form segments which are bent back toward a centerline of said clip and form elastic interlocking components.

11. A mechanism as claimed in claim 10, wherein said elastic interlocking components each have an upper portion cut away to a specified width for engagement with a surface of the shoe web opposite to said one surface of the shoe web.

12. A mechanism as claimed in claim 1, wherein said temperature sensor further includes a body portion between said base end and said detector, and said body portion has plural sections bent into curves extending away from said one surface of the shoe web.

* * * * *